(12) United States Patent  (10) Patent No.: US 8,962,199 B2
Yukimasa et al.  (45) Date of Patent: Feb. 24, 2015

(54) FUEL CELL SYSTEM

(75) Inventors: Akinori Yukimasa, Osaka (JP); Junji Morita, Kyoto (JP); Akinari Nakamura, Shiga (JP); Takayuki Urata, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 266 days.

(21) Appl. No.: 13/382,385

(22) PCT Filed: Jul. 8, 2010

(86) PCT No.: PCT/JP2010/004458
§ 371 (c)(1),
(2), (4) Date: Jan. 5, 2012

(87) PCT Pub. No.: WO2011/004606
PCT Pub. Date: Jan. 13, 2011

(65) Prior Publication Data
US 2012/0107703 A1 May 3, 2012

(30) Foreign Application Priority Data

Jul. 8, 2009 (JP) ................. 2009-161968

(51) Int. Cl.
*H01M 8/04* (2006.01)
*H01M 8/18* (2006.01)
(Continued)

(52) U.S. Cl.
CPC ........... *C01B 3/384* (2013.01); *H01M 8/04029* (2013.01); *H01M 8/04291* (2013.01);
(Continued)

(58) Field of Classification Search
None
See application file for complete search history.

(56) References Cited

U.S. PATENT DOCUMENTS 5,766,786 A * 6/1998 Fleck et al. ............ 429/413
2009/0130529 A1 5/2009 Yamamoto et al.
(Continued)

FOREIGN PATENT DOCUMENTS

EP 1575110 A1 9/2005
JP 03-057163 3/1991
(Continued)

OTHER PUBLICATIONS

English translation for JP 2005-235586.*
(Continued)

*Primary Examiner* — Yoshitoshi Takeuchi
(74) *Attorney, Agent, or Firm* — McDermott Will & Emery LLP

(57) ABSTRACT

A fuel cell system of the present invention includes: a reformer (1) configured to generate a hydrogen-containing fuel gas from a material gas and steam; a fuel cell (101) configured to generate electric power by using a fuel gas supplied from the reformer (1); a water tank (3) configured to store water; a water utilizing device configured to utilize the water supplied from the water tank (3); a first water supply unit (5) disposed on a water passage (30) extending from the water tank (3) to the water utilizing device and configured to supply the water in the water tank (3) to the water utilizing device; and a purifier (4) disposed on the water passage (30) and configured to purify the water flowing through the water passage (30), and the purifier (4) is provided such that when a water level of the water tank (3) is a full water level, the purifier (4) is filled with the water by the weight of the water.

15 Claims, 8 Drawing Sheets

(51) Int. Cl.
  *H01M 8/06* (2006.01)
  *H01M 8/00* (2006.01)
  *C01B 3/38* (2006.01)
  *C02F 1/42* (2006.01)
  *H01M 8/10* (2006.01)

(52) U.S. Cl.
  CPC ..... *H01M8/0618* (2013.01); *C01B 2203/0233* (2013.01); *C01B 2203/066* (2013.01); *C01B 2203/0822* (2013.01); *C01B 2203/0827* (2013.01); *C01B 2203/1258* (2013.01); *C02F 1/42* (2013.01); *H01M 8/0662* (2013.01); *H01M 2008/1095* (2013.01); *Y02E 60/50* (2013.01)
  USPC ........... 429/410; 429/515; 429/512; 429/417; 429/416; 429/415; 429/414; 429/413; 429/408; 429/400

(56) References Cited

U.S. PATENT DOCUMENTS

| | | | |
|---|---|---|---|
| 2010/0203412 | A1 | 8/2010 | Yamamoto et al. |
| 2010/0297512 | A1* | 11/2010 | Shinoda et al. ............... 429/423 |
| 2010/0297513 | A1 | 11/2010 | Yasuda et al. |

FOREIGN PATENT DOCUMENTS

| | | | | |
|---|---|---|---|---|
| JP | 07-320766 | * | 12/1995 | ............. H01M 8/06 |
| JP | 10-223246 | | 8/1998 | |
| JP | 2001-338668 | | 12/2001 | |
| JP | 2002-177932 | A | 6/2002 | |
| JP | 2004-234965 | A | 8/2004 | |
| JP | 2005-100693 | | 4/2005 | |
| JP | 2005-108561 | A | 4/2005 | |
| JP | 2005-166404 | | 6/2005 | |
| JP | 2005-235586 | * | 9/2005 | ............. H01M 8/04 |
| JP | 2006-107893 | A | 4/2006 | |
| JP | 2006-164837 | A | 6/2006 | |
| JP | 2007-257953 | A | 10/2007 | |
| JP | 2008-027684 | A | 2/2008 | |
| JP | 2008-053158 | A | 3/2008 | |
| JP | 2008-103276 | * | 5/2008 | ............. H01M 8/04 |
| JP | 2008-135271 | | 6/2008 | |
| JP | 2008-175072 | A | 7/2008 | |
| JP | 2008-269807 | A | 11/2008 | |
| JP | 2009-037830 | A | 2/2009 | |
| JP | 2009-129874 | A | 6/2009 | |
| WO | 2006088053 | A1 | 8/2006 | |
| WO | 2009-047897 | A1 | 4/2009 | |

OTHER PUBLICATIONS

English translation for JP 2005-235586 (2005).*
Extended European Search Report issued in European Patent Application No. 10796917.2 mailed Nov. 19, 2012.
Chinese Office Action issued in Application No. 201080030497.1 with mailing date of Aug. 6, 2013.
Japanese Office Action issued in Japanese Application No. 2011-521824 issued on Feb. 12, 2014.
Japanese Office Action issued in Japanese Application No. 2013-194227 dated Jul. 15, 2014.
Japanese Office Action issued in Japanese Application No. 2013-194228 dated Jul. 15, 2014.

* cited by examiner

US 8,962,199 B2

FUEL CELL SYSTEM

RELATED APPLICATIONS

This application is the U.S. National Phase under 35 U.S.C. §371 of International Application No. PCT/JP2010/004458, filed on Jul. 8, 2010, which in turn claims the benefit of Japanese Application No. 2009-161968, filed on Jul. 8, 2009, the disclosures of which Applications are incorporated by reference herein.

TECHNICAL FIELD

The present invention relates to a fuel cell system including a purifier configured to purify water in a water tank.

BACKGROUND ART

A fuel cell system is a system configured to generate electric power and heat by an electrochemical reaction between a fuel gas (hydrogen-containing gas) and oxidizing gas (for example, air) supplied to a fuel cell. The electric power generated by a common domestic fuel cell system is supplied to some of home-use electric power loads (for example, electrical appliances, such as lights and air conditioners). The heat generated by the electric power generation is stored as hot water in a hot water tank, and the hot water in the hot water tank is supplied to domestic heat loads (for example, heat utilizing devices, such as water heaters and floor heating).

Since an infrastructure for supplying the hydrogen-containing gas necessary in the electric power generating operation of the fuel cell system is not developed, the fuel cell system is normally provided with a reformer configured to generate the hydrogen-containing gas. The reformer generates the hydrogen-containing gas by causing a steam-reforming reaction in a reforming catalyst between a material gas (gas containing an organic compound (for example, city gas)) and water.

To suppress the deterioration of the reformer and the fuel cell, it is preferable that the water supplied to the reformer be purified water. Here, a fuel cell apparatus is known, in which an activated carbon filter for purifying the water, a reverse osmosis membrane for purifying the water, a water tank for storing the water, an ion-exchange resin for purifying the water, and a water pump for supplying to the reformer the water having flowed through the ion-exchange resin are sequentially connected toward the reformer (see PTL 1). According to the fuel cell apparatus disclosed in PTL 1, tap water or the like flows through the activated carbon filter and the reverse osmosis membrane, and the purified water is stored in the water tank. Then, the water is supplied from the water tank through the purifier including the ion-exchange resin to the reformer in accordance with the amount necessary for the steam-reforming reaction. This can improve water responsiveness (see PTL 1, for example).

A fuel cell electric power generator is known, in which a purifier including an ion-exchange resin is disposed on a water passage through which water supplied from a water tank to a cooling water tank flows (see PTL 2, for example).

CITATION LIST

Patent Literature

PTL 1: Japanese Laid-Open Patent Application Publication No. 2008-135271
PTL 2: Japanese Laid-Open Patent Application Publication No. 2001-338668

SUMMARY OF INVENTION

Technical Problem

Here, when the fuel cell system is installed or after the water is removed from the fuel cell system, the water passage is empty. Therefore, generally, a water filling operation of the water passage needs to be executed.

Here, according to the fuel cell apparatus disclosed in PTL 1, when executing the water filling operation of the water passage including the purifier, the water pump may be activated to fill the water passage with the water. In this case, since the water passage includes the purifier, extra electric power for performing the water filling operation of the purifier is consumed compared to the water passage not including the purifier. To be specific, there is still room for improvement in light of energy saving performance.

The present invention was made to solve the above conventional problems, and an object of the present invention is to provide a fuel cell system capable of reducing, compared to before, electric power consumed by a water supply unit when the purifier is filled with the water by the operation of the water supply unit.

Solution to Problem

To solve the above problems, a fuel cell system according to a first aspect of the present invention includes: a reformer configured to generate a hydrogen-containing fuel gas from a material gas and steam; a fuel cell configured to generate electric power by using the fuel gas; a water tank configured to store water; a water utilizing device configured to utilize the water supplied from the water tank; a first water supply unit disposed on a water passage extending from the water tank to the water utilizing device and configured to supply the water in the water tank to the water utilizing device; and a purifier configured to purify the water flowing through the water passage, wherein the purifier is disposed on the water passage such that when a water level of the water tank is a full water level, the purifier is filled with the water by the weight of the water.

The fuel cell system according to a second aspect of the present invention may be configured such that in the fuel cell system according to the first aspect of the present invention, the water passage extending from the purifier to the first water supply unit is a first water passage, and an exhaust port configured such that a gas in the purifier is discharged through the exhaust port to the atmosphere is provided at at least one of the purifier and the first water passage.

The fuel cell system according to a third aspect of the present invention may be configured such that the fuel cell system according to the second aspect of the present invention further includes a degassing passage configured to connect the exhaust port and the water tank, wherein the water tank is open to the atmosphere.

The fuel cell system according to a fourth aspect of the present invention may be configured such that in the fuel cell system according to the third aspect of the present invention, a first valve configured to open and close the degassing passage is disposed on the degassing passage.

The fuel cell system according to a fifth aspect of the present invention may be configured such that the fuel cell system according to the fourth aspect of the present invention further includes a controller, wherein: the controller opens the first valve when performing a water filling operation of the purifier; and the controller closes the first valve when performing a hydrogen generating operation of the reformer.

The fuel cell system according to a sixth aspect of the present invention may be configured such that in the fuel cell system according to the first aspect of the present invention, the water utilizing device is open to the atmosphere.

The fuel cell system according to a seventh aspect of the present invention may be configured such that in the fuel cell system according to the first aspect of the present invention, the purifier is provided downstream of the first water supply unit, and the first water supply unit is disposed on the water passage such that when the water level of the water tank is the full water level, the first water supply unit is filled with the water by the weight of the water.

The fuel cell system according to an eighth aspect of the present invention may be configured such that the fuel cell system according to the first aspect of the present invention further includes a first water level detector configured to detect the water level of the purifier.

The fuel cell system according to a ninth aspect of the present invention may be configured such that in the fuel cell system according to the eighth aspect of the present invention, the first water level detector is configured to detect the water level of the purifier by detecting the water level of the water tank.

The fuel cell system according to a tenth aspect of the present invention may be configured such that the fuel cell system according to the ninth aspect of the present invention further includes: a water feed unit configured to supply the water to the water tank; and a controller, wherein when the first water level detector detects an increase in the water level, the controller stops the water supply of the water feed unit.

The fuel cell system according to an eleventh aspect of the present invention may be configured such that in the fuel cell system according to the tenth aspect of the present invention, when the first water level detector detects a decrease in the water level after the water supply of the water feed unit is stopped, the controller restarts the water supply of the water feed unit.

The fuel cell system according to a twelfth aspect of the present invention may be configured such that in the fuel cell system according to the eighth aspect of the present invention, the water utilizing device is an evaporator configured to generate the steam, and the water passage extending from the purifier to the evaporator is a second water passage, and the fuel cell system further includes: a third water passage configured to branch from the second water passage and including an open end which is open to the atmosphere; a first switching unit configured to connect the first water supply unit selectively to the evaporator and the open end of the third water passage; and a controller, wherein when the first water level detector detects that the water level of the purifier is the full water level, the controller activates the first water supply unit in a state where the first water supply unit and the open end of the third water passage are connected to each other by the first switching unit.

The fuel cell system according to a thirteenth aspect of the present invention may be configured such that in the fuel cell system according to the first aspect of the present invention, the water utilizing device is a cooling water tank configured to store the water which is to be supplied through a cooling water passage to the fuel cell, and the fuel cell system further includes: an evaporator configured to generate the steam; a second water level detector configured to detect the water level of the cooling water tank; a fourth water passage configured to connect the cooling water passage and the evaporator; a second water supply unit disposed on the fourth water passage and configured to supply the water to the evaporator; a branch passage configured to branch from the fourth water passage and including an open end which is open to the atmosphere; a second switching unit configured to connect the second water supply unit selectively to the evaporator and the open end of the branch passage; and a controller, wherein when the second water level detector detects that the water level of the cooling water tank is a predetermined water level, the controller activates the second water supply unit in a state where the second water supply unit and the open end of the branch passage are connected to each other by the second switching unit.

The fuel cell system according to a fourteenth aspect of the present invention may be configured such that the fuel cell system according to the thirteenth aspect of the present invention further includes a cooling water supply unit disposed on the cooling water passage and configured to supply the water in the cooling water tank to the fuel cell, wherein the controller activates the second water supply unit and the cooling water supply unit.

Advantageous Effects of Invention

According to the fuel cell system of the present invention, the purifier is provided such that when the water level of the water tank is the full water level, the purifier is filled with the water by the weight of the water. Therefore, the electric power consumed by the water supply unit when the purifier is filled with the water by the operation of the water supply unit can be made smaller than before.

DESCRIPTION OF EMBODIMENTS

Figure 1:
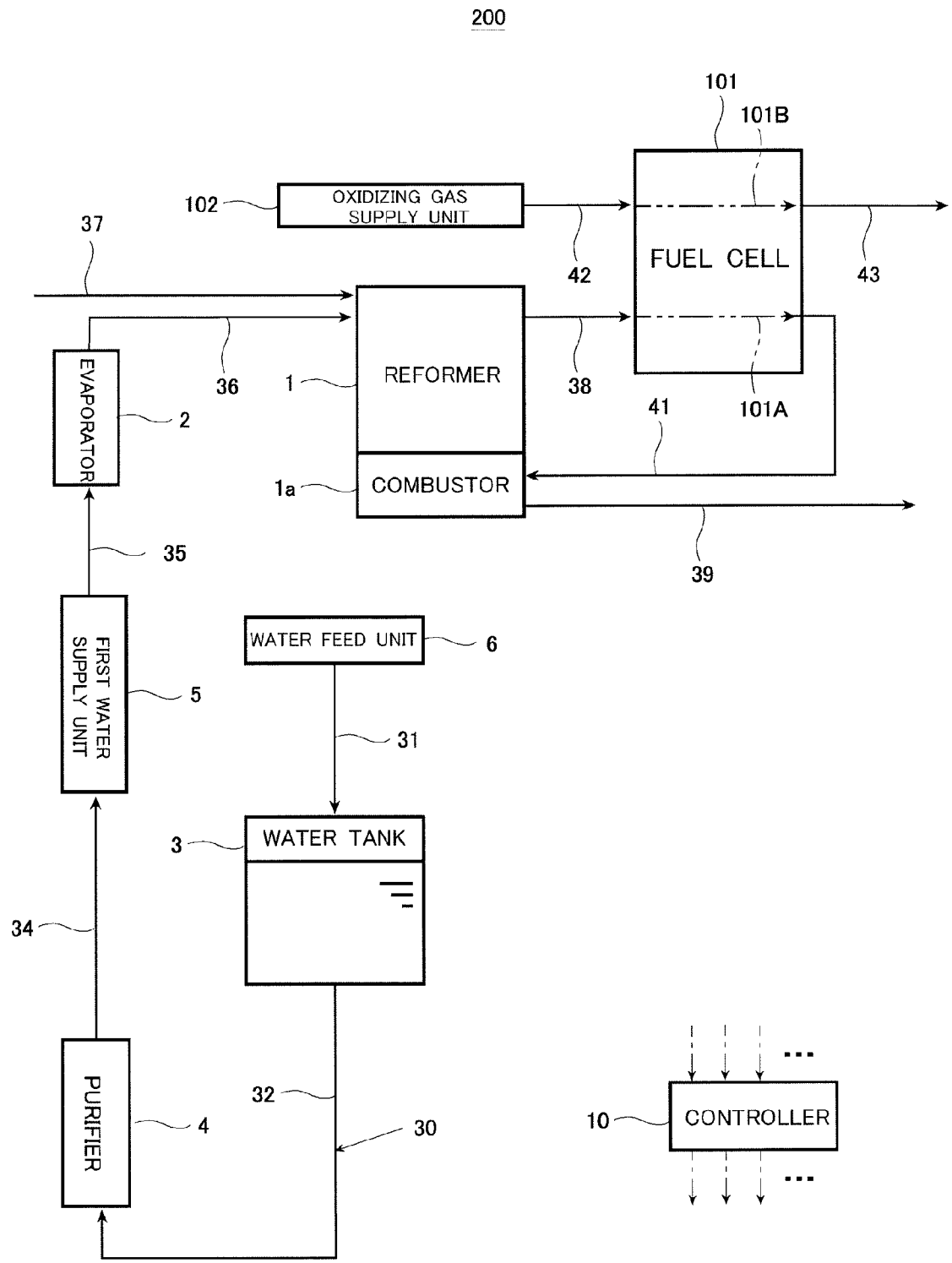
FIG. 1 is a schematic diagram showing the schematic configuration of a fuel cell system according to Embodiment 1 of the present invention.

Hereinafter, preferred embodiments of the present invention will be explained in reference to the drawings. In the drawings, the same reference signs are used for the same or corresponding components, and a repetition of the same explanation is avoided.

A fuel cell system according to an embodiment of the present invention includes: a reformer configured to generate a hydrogen-containing fuel gas from a material gas and steam; a fuel cell configured to generate electric power by using the fuel gas; a water tank configured to store water; a water utilizing device configured to utilize the water supplied from the water tank; a first water supply unit disposed on a water passage extending from the water tank to the water utilizing device and configured to supply the water in the water tank to the water utilizing device; and a purifier disposed on the water passage and configured to purify the water flowing through the water passage, and the purifier is disposed on the water passage such that when a water level of the water tank is a full water level, the purifier is filled with the water by the weight of the water.

Here, the phrase "the full water level of the water tank" denotes the water level when the water filling operation of the water tank is completed and does not necessarily denote that the water tank is filled with the water up to an upper end of the water tank.

Here, the sentence "the purifier is filled with the water" denotes that the water fills the purifier.

According to the above configuration, the purifier is disposed such that when the water level of the water tank is the full water level, the purifier is filled with the water by the weight of the water. Therefore, the electric power consumed by the water supply unit when the purifier is filled with the water by the operation of the water supply unit can be made smaller than before.

Hereinafter, embodiments of the present invention will be specifically explained. The following specific explanations are just examples of the features of the fuel cell system. For example, in the case of explaining the following specific examples by attaching suitable reference signs to the same terms as the terms having specified the above fuel cell system, such specific device is one example of a component of the above fuel cell system, the component corresponding to the specific device. Therefore, the features of the fuel cell system are not limited by the following specific explanations.

Embodiment 1

Embodiment 1 of the present invention shows one example of a mode in which the water utilizing device is an evaporator.

Configuration of Fuel Cell System

FIG. 1 is a schematic diagram showing the schematic configuration of the fuel cell system according to Embodiment 1 of the present invention.

As shown in FIG. 1, a fuel cell system 200 according to Embodiment 1 of the present invention includes a reformer 1, a fuel cell 101, a water tank 3, an evaporator 2 that is the water utilizing device, a first water supply unit 5, and a purifier 4. The purifier 4 is disposed such that when the water level of the water tank 3 is the full water level, the purifier 4 is filled with the water by the weight of the water.

Here, the full water level of the water tank 3 may be defined as a predetermined water level detected by a water level detector configured to detect the water level of the water tank 3 or may be defined by providing an overflow passage at the water tank 3.

A water feed unit 6 is connected to the water tank 3 through a water feed passage 31. The water feed unit 6 is connected to, for example, a water pipe or a water supply valve (not shown). The water feed unit 6 supplies the water (herein, tap water) through the water feed passage 31 to the water tank 3. For example, a combination of a flow rate control valve and a pump or a combination of an on-off valve and a pump can be used as the water feed unit 6.

An upstream end of a water supply passage 32 is connected to a lower portion (herein, a lower end surface) of the water tank 3, and a downstream end thereof is connected to a lower portion (herein, a lower end surface) of the purifier 4.

The purifier 4 may be any device as long as it can purify the water. In Embodiment 1, the purifier 4 is constituted by a case filled with ion-exchange resin. The purifier 4 is provided outside the water tank 3 and purifies the water such that impurities (mainly, ions) contained in the water are adsorbed to the ion-exchange resin. Other than the ion-exchange resin, an activated carbon filter or a reverse osmosis membrane may be used as the purifier 4.

An upstream end of a first water passage 34 is connected to an upper portion (herein, an upper end surface) of the purifier 4, and a downstream end thereof is connected to the first water supply unit 5. In Embodiment 1, the water supply passage 32 is connected to the lower portion of the purifier 4, and the first water passage 34 is connected to the upper portion of the purifier 4. However, the present embodiment is not limited to this, and each of the water supply passage 32 and the first water passage 34 may be connected to any portion of the purifier 4. To adequately purify the water supplied to the purifier 4, it is preferable that a portion where the water supply passage 32 is connected to the purifier 4 and a portion where the first water passage 34 is connected to the purifier 4 be spaced apart from each other.

The first water supply unit 5 may be any device as long as it can adjust the flow rate of the water supplied from the water tank 3 to the evaporator 2 that is the water utilizing device. The first water supply unit 5 may be constituted by, for example, a flow rate control valve, a pump, or a combination of a pump and a flow rate control valve.

The evaporator 2 may be configured to evaporate the water purified by the purifier 4 to generate steam. For example, the evaporator 2 may be configured to evaporate the water to generate the steam by heat transfer of a flue gas generated by a below-described combustor 1a. The evaporator 2 is connected to the reformer 1 through a steam supply passage 36. With this, the evaporator 2 evaporates the water purified by the purifier 4 to generate the steam and supplies the steam to the reformer 1.

A material gas supply passage 37 is connected to the reformer 1. A material gas (for example, a city gas containing methane as a major component) is supplied from a material gas source, not shown, through the material gas supply passage 37 to the reformer 1. Examples of the material gas source are a city gas (natural gas) infrastructure and a LPG bomb. A gas containing an organic compound containing at least carbon and hydrogen as constituent elements can be used as the material gas. Specifically, examples of the material gas are a gas containing hydrocarbon, such as ethane or propane, and a gas containing gas alcohol.

The combustor 1a is provided at the reformer 1. The combustor 1a is configured so as to be supplied with a combustion gas (combustible gas) and combustion air. Examples of the combustion gas (combustible gas) are a hydrogen-containing gas discharged from the reformer 1 and the fuel gas unconsumed by the below-described fuel cell 101. Thus, the combustor 1a combusts the combustible gas and the air and generates the flue gas. By the heat transfer of the flue gas, respective devices, such as the reformer 1 and the evaporator 2, are heated. The flue gas is discharged through a flue gas passage 39 to the outside of the fuel cell system 200 (to the atmosphere).

A reforming catalyst (not shown) is provided in an internal space of the reformer 1, and the hydrogen-containing gas is generated by a steam-reforming reaction between the material gas supplied from the material gas supply passage 37 and the steam supplied from the evaporator 2. The hydrogen-containing gas generated by the reformer 1 is supplied as the fuel gas through a fuel gas supply passage 38 to the fuel cell 101.

In Embodiment 1, the hydrogen-containing gas generated by the reformer 1 is directly supplied to the fuel cell 101. However, a shift converter configured to reduce carbon monoxide contained in the hydrogen-containing gas generated by the reformer 1 by a shift reaction or a CO remover configured to reduce the carbon monoxide by an oxidation reaction may be provided downstream of the reformer 1.

The fuel cell 101 includes a fuel gas internal channel 101A and an oxidizing gas internal channel 101B. The fuel gas supply passage 38 is connected to an upstream end of the fuel gas internal channel 101A, and the combustor 1a is connected to a downstream end of the fuel gas internal channel 101A through an off fuel gas passage 41. An oxidizing gas supply unit 102 is connected to an upstream end of the oxidizing gas internal channel 101B through an oxidizing gas supply passage 42, and an off oxidizing gas passage 43 is connected to a downstream end of the oxidizing gas internal channel 101B. The oxidizing gas supply unit 102 is configured to be able to supply the oxidizing gas (for example, air) to the fuel cell 101. For example, a fan or a blower can be used as the oxidizing gas supply unit 102. A downstream end of the off oxidizing gas passage 43 is open to the atmosphere.

With this, the fuel gas generated by the reformer 1 is supplied through the fuel gas supply passage 38 to the fuel gas internal channel 101A of the fuel cell 101. In addition, the oxidizing gas is supplied from the oxidizing gas supply unit 102 through the oxidizing gas supply passage 42 to the oxidizing gas internal channel 101B of the fuel cell 101.

In the fuel cell 101, the fuel gas supplied to the fuel gas internal channel 101A is supplied to an anode (not shown), and the oxidizing gas supplied to the oxidizing gas internal channel 101B is supplied to a cathode (not shown). The fuel gas supplied to the anode and the oxidizing gas supplied to the cathode electrochemically react with each other to generate electricity and heat. The fuel gas unconsumed in the anode (hereinafter, an off fuel gas) is supplied through the off fuel gas passage 41 to the combustor 1a and is used as the combustible gas. The oxidizing gas unconsumed in the cathode (hereinafter, an off oxidizing gas) is discharged through the off oxidizing gas passage 43 to the atmosphere.

In the fuel cell system 200, the type of the fuel cell is not limited. Examples of the fuel cell are a polymer electrolyte fuel cell, a phosphoric-acid fuel cell, and a solid-oxide fuel cell. The solid-oxide fuel cell may be an external reforming type in which the reformer 1 and the fuel cell 101 are separately formed or may be an internal reforming type in which the reformer 1 and the fuel cell 101 are integrally formed.

The fuel cell system 200 includes a controller 10. The controller 10 is constituted by, for example, a microcomputer and performs various control operations regarding the fuel cell system 200.

Operations of Fuel Cell System

Next, the operations of the fuel cell system 200 according to Embodiment 1 will be explained in reference to FIG. 1. Especially, the operations of the fuel cell system 200 after the installation of the fuel cell system 200, after the long-term storage of the fuel cell system 200, or after the replacement of the ion-exchange resin of the purifier 4 will be explained in reference to FIG. 1. The following operations are executed such that the controller 10 controls the fuel cell system 200.

First, the water feed unit 6 supplies the water through the water feed passage 31 to the water tank 3. A part of the water supplied to (stored in) the water tank 3 is supplied through the water supply passage 32 to the purifier 4 (water filling operation of the purifier 4). At this time, since the purifier 4 is located lower than the water surface in the water tank 3, the water in the water tank 3 is transferred to the purifier 4 by potential head. By continuously supplying the water to the water tank 3, the purifier 4 can be filled with the water without activating the first water supply unit 5. To be specific, the fuel cell system 200 according to Embodiment 1 can perform the water filling operation of the purifier 4 while reducing the amount of work of the first water supply unit 5 compared to conventional fuel cell systems.

With this, the fuel cell system 200 according to Embodiment 1 can reduce the consumption of the electric power energy necessary to perform the water filling operation of the purifier 4 compared to the conventional fuel cell systems. The controller 10 stores a water supply time which is obtained in advance by experiments or the like and in which the water level of the water tank 3 becomes the full water level and the purifier 4 is filled with the water. When the water supply time has elapsed, the controller 10 stops the supply of the water from the water feed unit 6. The fuel cell system 200 according to Embodiment 1 is not limited to a mode in which the first water supply unit 5 is not activated at all in the water filling operation of the purifier 4. The first water supply unit 5 may be operated as long as the electric power consumed by the first water supply unit 5 when the purifier 4 is filled with the water by the operation of the first water supply unit 5 is smaller than that of the conventional fuel cell system.

Next, when the purifier 4 is filled with the water, the water feed unit 6 stops supplying the water. Then, the combustible gas and the combustion air are supplied to the combustor 1a, and the combustor 1a combusts the combustible gas and the air and generates the flue gas. The flue gas heats the reformer 1, the evaporator 2, and the like and is discharged through the flue gas passage 39 to the outside of the fuel cell system 200. The generation of the flue gas by the combustor 1a may be performed at the same time as the supply of the water from the water feed unit 6 to the water tank 3.

Next, the first water supply unit 5 is activated, and the water purified by the purifier 4 is supplied through the first water passage 34 and a second water passage 35 to the evaporator 2. The evaporator 2 evaporates the supplied water to generate the steam. Then, the steam is supplied through the steam supply passage 36 to the reformer 1. In addition, the material gas is supplied through the material gas supply passage 37 to the reformer 1. The reformer 1 generates the hydrogen-containing gas by the steam-reforming reaction between the material gas and the steam (hydrogen generating operation of the reformer 1).

Then, the hydrogen-containing gas generated by the reformer 1 is supplied as the fuel gas through the fuel gas supply passage 38 to the fuel gas internal channel 101A of the fuel cell 101. In addition, the oxidizing gas is supplied from the oxidizing gas supply unit 102 through the oxidizing gas supply passage 42 to the oxidizing gas internal channel 101B of the fuel cell 101.

In the fuel cell 101, the fuel gas supplied to the anode and the oxidizing gas supplied to the cathode electrochemically react with each other to generate electricity and heat. The generated electric power is supplied to an external electric power load by an electric power conditioner including at least one of an inverter and a converter. The off fuel gas unconsumed in the anode is supplied through the off fuel gas passage 41 to the combustor 1a and is used as the combustible gas. The off oxidizing gas unconsumed in the cathode is discharged through the off oxidizing gas passage 43 to the atmosphere.

As above, the fuel cell system 200 according to Embodiment 1 can perform the water filling operation of the purifier 4 while reducing the power consumption of the first water supply unit 5 compared to before. Therefore, the energy saving performance can be improved. In Embodiment 1, the first water supply unit 5 is provided downstream of the purifier 4. However, the present embodiment is not limited to this, and the first water supply unit 5 may be provided upstream of the purifier 4.

Embodiment 2

Embodiment 2 of the present invention shows one example of a mode in which an exhaust port through which the gas in the purifier is discharged to the atmosphere is provided at the purifier.

In the fuel cell system according to Embodiment 2 of the present invention, the exhaust port through which the gas in the purifier is discharged to the atmosphere is provided at the purifier.

Here, the exhaust port may be any port as long as the gas in the purifier can be discharged to the atmosphere. The gas may be directly discharged through the exhaust port to the atmosphere or may be indirectly discharged through, for example, a passage, which communicates with the exhaust port, to the atmosphere.

With this, when supplying the water from the water tank to the purifier, the gas (for example, air) in the purifier is discharged through the exhaust port. Thus, the water can be supplied more smoothly.

The fuel cell system according to Embodiment 2 includes a degassing passage which connects the exhaust port and the water tank, and the water tank is open to the atmosphere.

Figure 2:
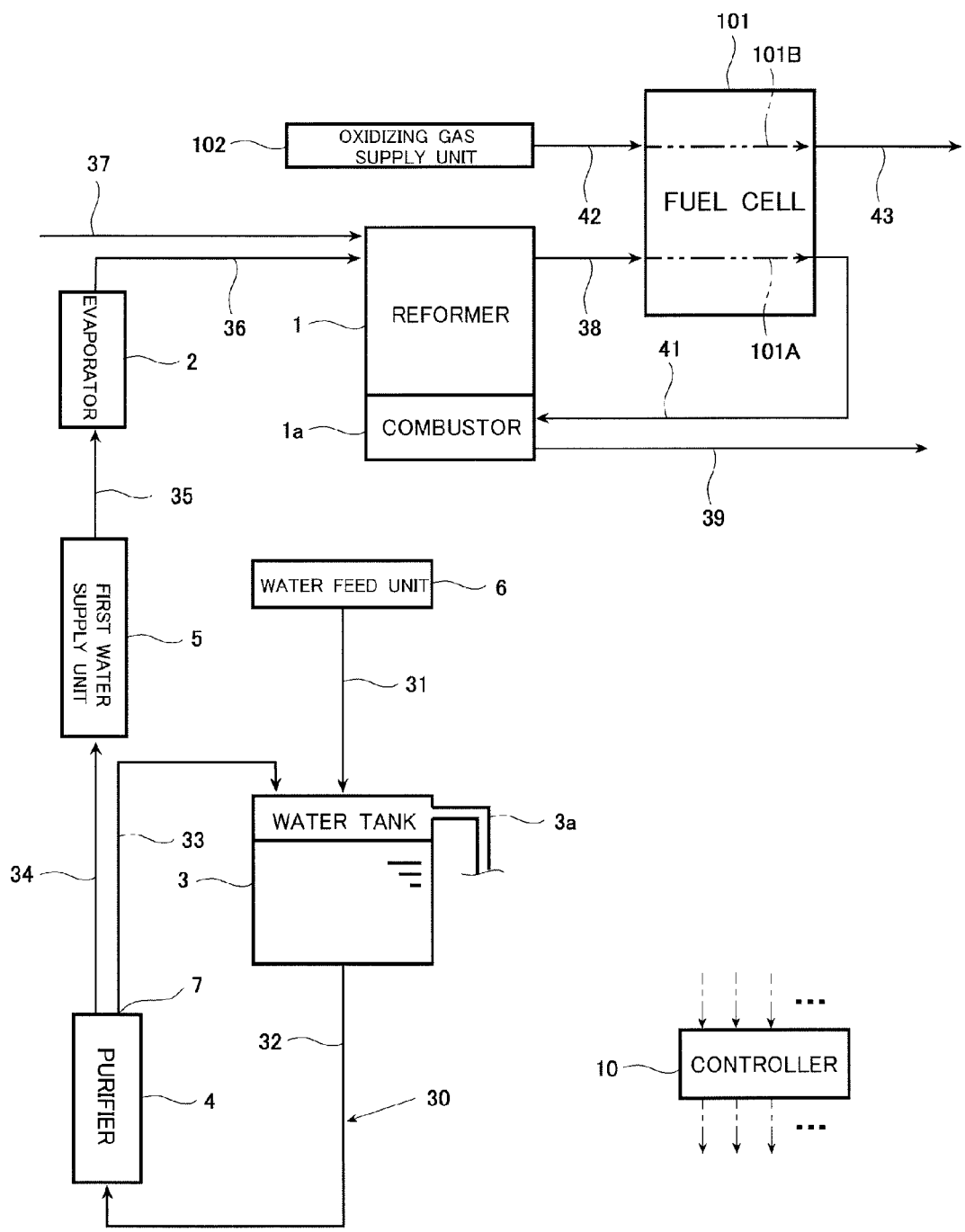
FIG. 2 is a schematic diagram showing the schematic configuration of the fuel cell system according to Embodiment 2 of the present invention.

FIG. 2 is a schematic diagram showing the schematic configuration of the fuel cell system according to Embodiment 2 of the present invention.

As shown in FIG. 2, the fuel cell system 200 according to Embodiment 2 of the present invention is the same in basic configuration as the fuel cell system 200 according to Embodiment 1 but is different from the fuel cell system 200 according to Embodiment 1 in that: an overflow passage 3a is provided at the water tank 3; an exhaust port 7 is provided at the purifier 4; and a degassing passage 33 which connects the exhaust port 7 and the water tank 3 is provided.

Specifically, the overflow passage 3a which defines the position of the full water level of the water tank 3 is provided at the water tank 3, and a downstream end of the overflow passage 3a is open to the atmosphere. With this, if the water is supplied to exceed the full water level of the water tank 3, the water is discharged through the overflow passage 3a to the outside of the fuel cell system 200.

The exhaust port 7 is provided at the purifier 4, and the exhaust port 7 is connected to the water tank 3 through the degassing passage 33. More specifically, a downstream end of the degassing passage 33 is connected to a portion of the water tank 3, the portion being located on an upper side of an upstream end of the overflow passage 3a. With this, when filling the purifier 4 with the water, the gas (mainly, air) in the purifier 4 is discharged through the exhaust port 7, the degassing passage 33, and the overflow passage 3a of the water tank 3 to the atmosphere. To be specific, in Embodiment 1, the water tank 3 is open to the atmosphere through the overflow passage 3a.

The fuel cell system 200 according to Embodiment 2 configured as above has the same operational advantages as the fuel cell system 200 according to Embodiment 1. In addition, in the fuel cell system 200 according to Embodiment 2, the purifier 4 is open to the atmosphere. Therefore, when performing the water filling operation of the purifier 4, the increase in internal pressure of the water passage including the purifier 4 is suppressed. Thus, the water can be supplied to the purifier 4 more smoothly.

In Embodiment 2, the purifier 4 communicates with the atmosphere through the exhaust port 7, the degassing passage 33, the space above the water surface in the water tank 3, and the overflow passage 3a. However, the present embodiment is not limited to this. For example, the purifier 4 may simply communicate with the atmosphere through the exhaust port 7 without providing the degassing passage 33. In this case, whether to provide the overflow passage 3a is optional.

Modification Example 1

Next, Modification Example of the fuel cell system 200 according to Embodiment 2 will be explained.

Modification Example of Embodiment 2 shows one example of a mode in which the exhaust port is provided at the first water passage.

Figure 3:
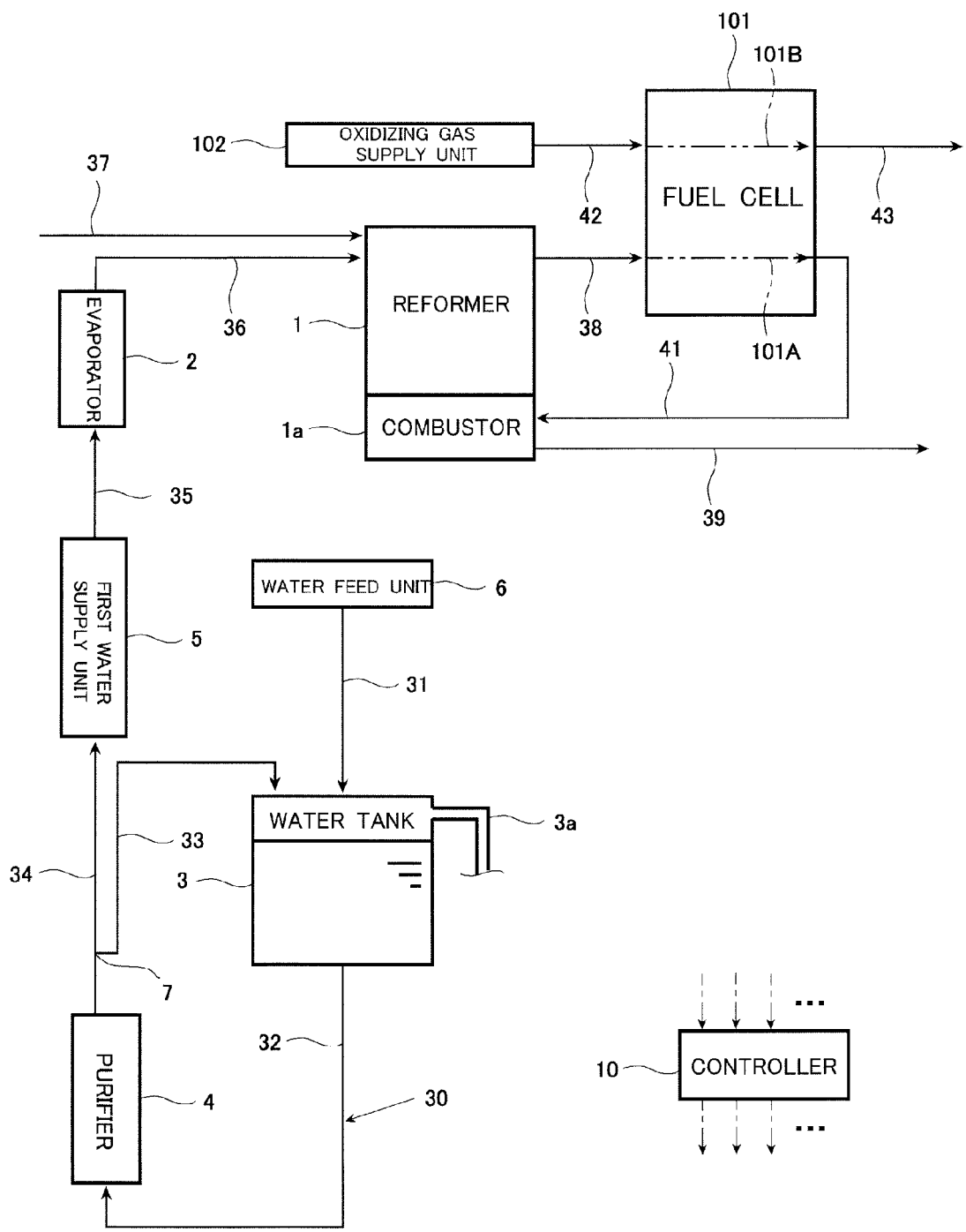
FIG. 3 is a schematic diagram showing the schematic configuration of the fuel cell system of Modification Example 1 of the present invention.

FIG. 3 is a schematic diagram showing the schematic configuration of the fuel cell system of Modification Example 1 of the present invention.

As shown in FIG. 3, in the fuel cell system 200 of Modification Example 1, the exhaust port 7 is provided at a portion of the first water passage 34, and an upstream end of the degassing passage 33 is connected to the exhaust port 7 of the first water passage 34. The fuel cell system 200 according to Modification Example 1 configured as above has the same operational advantages as the fuel cell system 200 according to Embodiment 2.

As with Embodiment 2, in Modification Example 1, for example, the first water passage 34 may simply communicate with the atmosphere through the exhaust port 7 without providing the degassing passage 33. In this case, whether to provide the overflow passage 3a is optional.

Embodiment 3

Embodiment 3 of the present invention shows one example of a mode in which a first valve is disposed on the degassing passage.

In the fuel cell system according to Embodiment 3, the first valve configured to open and close the degassing passage is disposed on the degassing passage.

Here, the sentence "the first valve opens and closes the degassing passage" denotes that the flow of a gas or the like in the degassing passage is allowed or blocked by an opening or closing operation of the first valve. An on-off valve, such as a solenoid valve, may be used as the "first valve".

The fuel cell system according to Embodiment 3 includes the controller, and the controller opens the first valve when performing the water filling operation of the purifier and closes the first valve when performing an operation of generating the hydrogen-containing gas by the reformer (when performing the hydrogen generating operation of the reformer).

Here, the controller may be any device as long as it can control the first water supply unit and the first valve. The controller may be constituted by, for example, a microcomputer, a logic circuit, or the like. The controller may be a single controller or may be a group of a plurality of controllers which cooperate to execute the control operations of the fuel cell system. Therefore, the controller does not have to be constituted by a single controller and may be constituted by a plurality of controllers which are arranged in a distributed manner and cooperate to perform the control operations of fuel cell system.

Moreover, the phrase "performing the water filling operation of the purifier" denotes that the water is supplied to the purifier, and the purifier is filled with the water.

With this configuration, when performing the water filling operation of the purifier, the gas in the purifier is discharged through the degassing passage to the water tank. Therefore, the water can be smoothly supplied to the purifier. When performing the electric power generating operation of the fuel cell system (the hydrogen generating operation of the reformer), the first valve closes the degassing passage. With this, the water and gas in the water tank are prevented from flowing backward through the degassing passage to the purifier. On this account, the water which is not adequately purified is prevented from being supplied to the evaporator. In addition, it is possible to reduce the possibility that the gas gets in the first water passage and the first water passage and the like are clogged. Further, it is possible to reduce the possibility that the gas gets in the first water supply unit and the amount of water supplied by the first water supply unit fluctuates (so-called air entrainment).

The fuel cell system according to Embodiment 3 includes a first water level detector configured to detect the water level of the purifier.

Here, the first water level detector may be any device as long as it can detect the water level of the purifier and output the detected water level to the controller. For example, the first water level detector may directly detect the water level of the purifier or may indirectly detect the water level of the purifier. For example, a float switch may be used as the first water level detector.

With the above configuration, the termination of the water filling operation of the purifier can be easily detected, and it is unnecessary to excessively supply the water to the purifier. Thus, the hydrogen generating operation of the reformer can be started earlier, and therefore, the electric power generating operation of the fuel cell system can be started earlier.

Configuration of Fuel Cell System

Next, the configuration of the fuel cell system according to Embodiment 3 of the present invention will be explained in reference to FIG. 4.

Figure 4:
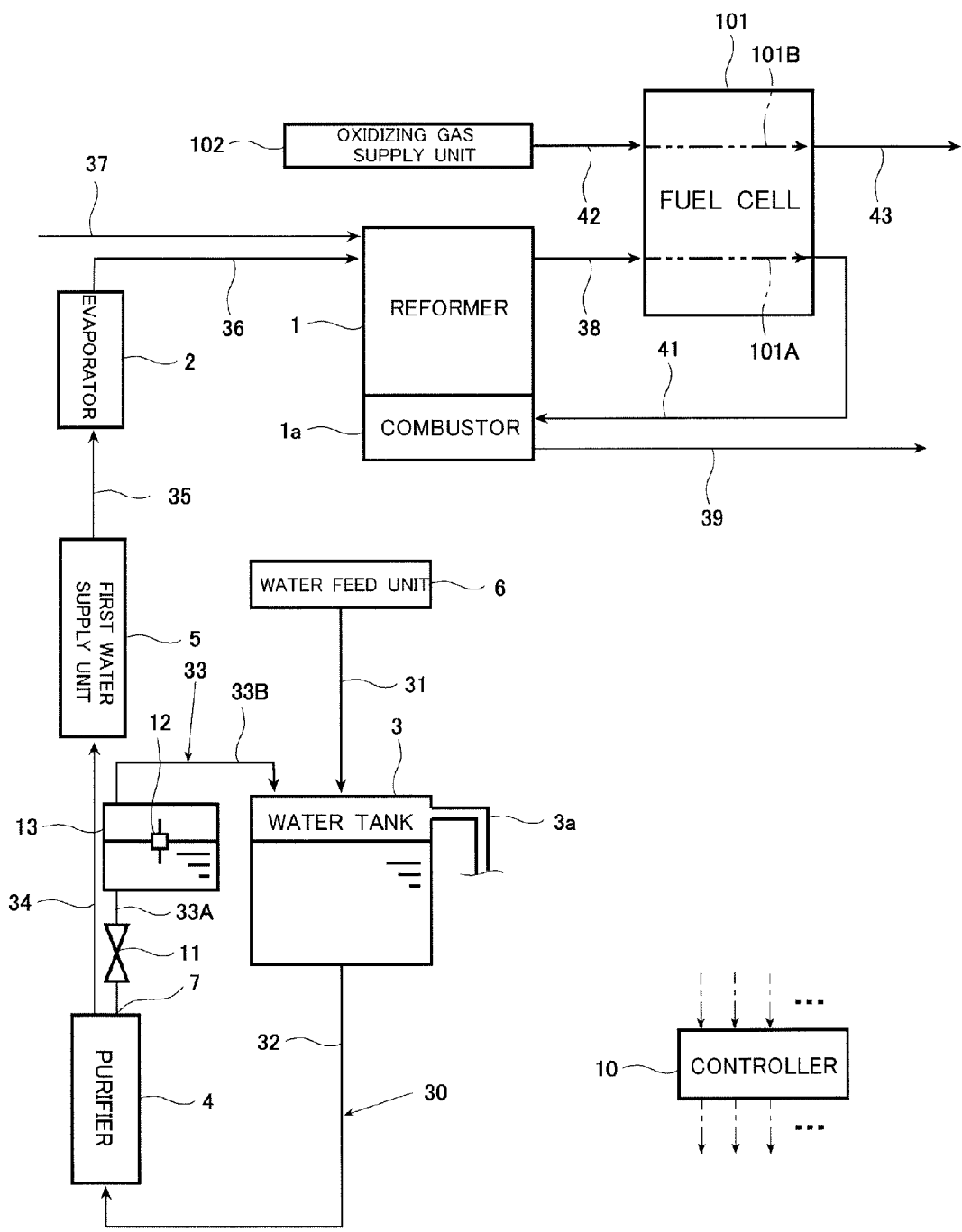
FIG. 4 is a schematic diagram showing the schematic configuration of the fuel cell system according to Embodiment 3 of the present invention.

FIG. 4 is a schematic diagram showing the schematic configuration of the fuel cell system according to Embodiment 3.

As shown in FIG. 4, the fuel cell system 200 according to Embodiment 3 of the present invention is the same in basic configuration as the fuel cell system 200 according to Embodiment 2 but is different from the fuel cell system 200 according to Embodiment 2 in that: a first valve 11 is disposed on a portion of the degassing passage 33; and a first water level detector 12 configured to detect the water level of the purifier 4 is provided.

Specifically, the degassing passage 33 includes a degassing passage upstream portion 33A and a degassing passage downstream portion 33B, and a water level detection tank 13 is provided so as to connect the degassing passage upstream portion 33A and the degassing passage downstream portion 33B. The water level detection tank 13 is located in a predetermined range including the height of the upstream end of the overflow passage 3a of the water tank 3. The first water level detector 12 configured to detect the water level of the water level detection tank 13 is provided at the water level detection tank 13.

With this, when the purifier 4 is filled with the water, and the water is supplied through the degassing passage upstream portion 33A to the water level detection tank 13, the first water level detector 12 detects the water level of the water level detection tank 13. In other words, when the first water level detector 12 has detected the water level of the water level detection tank 13, the purifier 4 has been filled with the water, and the first water level detector 12 can detect that the water level of the purifier 4 is the full water level. In Embodiment 3, the first valve 11 is disposed on a portion of the degassing passage upstream portion 33A. However, the present embodiment is not limited to this, and the first valve 11 may be disposed on a portion of the degassing passage downstream portion 33B.

Operations of Fuel Cell System

Next, the operations of the fuel cell system according to Embodiment 4 will be explained in reference to FIG. 4. Since the hydrogen generating operation of the reformer 1 and subsequent operations are the same as those in Embodiment 1, detailed explanations thereof are omitted.

First, the controller 10 causes the first valve 11 to open the degassing passage 33 (to be precise, the degassing passage upstream portion 33A). Next, as with Embodiment 1, the controller 10 supplies the water from the water feed unit 6 to the water tank 3. When the purifier 4 is filled with the water, and the water is supplied through the degassing passage upstream portion 33A to the water level detection tank 13, the first water level detector 12 detects the water level of the water level detection tank 13 and outputs a detection signal to the controller 10.

When the controller 10 receives the detection signal from the first water level detector 12, it determines that the purifier 4 has been filled with the water. Then, the controller 10 stops the water feed unit 6 and causes the first valve 11 to close the degassing passage 33 (to be precise, the degassing passage upstream portion 33A). Next, the controller 10 activates the first water supply unit 5, and the water purified by the purifier 4 is supplied through the first water passage 34 and the second water passage 35 to the evaporator 2. At this time, since the degassing passage 33 is being closed by the first valve 11, the water and gas (mainly, air) in the water level detection tank 13 are prevented from flowing backward through the degassing passage upstream portion 33A to the purifier 4.

Next, the controller 10 activates the water feed unit 6 when the first water level detector 12 detects that the water level of the water level detection tank 13 is decreased up to a predetermined water level. Then, the controller 10 stops the water feed unit 6 when the first water level detector 12 detects that the water level of the water level detection tank 13 is increased up to a predetermined water level. Thus, the controller 10 controls the water supply operation of the water feed unit 6 and the water level of the water tank 3 based on the water level detected by the first water level detector 12.

The fuel cell system 200 according to Embodiment 3 configured as above has the same operational advantages as the fuel cell system 200 according to Embodiment 1. In addition, in the fuel cell system 200 according to Embodiment 3, the termination of the water filling operation of the purifier 4 can be easily detected by causing the first water level detector 12 to detect the water level (full water level) of the purifier 4.

In Embodiment 3, the water level detection tank 13 is provided, and the first water level detector 12 is provided at the water level detection tank 13. However, the present embodiment is not limited to this. The first water level detector 12 may be directly provided in the purifier 4 or may be provided in the degassing passage 33.

Embodiment 4

Embodiment 4 of the present invention shows one example of a mode in which the first water level detector indirectly detects the water level of the purifier.

The fuel cell system according to Embodiment 4 is configured such that the first water level detector detects the water level of the water tank, the water level correlating with the water level of the purifier.

With this, the termination of the water filling operation of the purifier can be easily detected. In addition, the hydrogen generating operation of the reformer can be started earlier, and therefore, the electric power generating operation of the fuel cell system can be started earlier.

The fuel cell system according to Embodiment 4 includes: the water feed unit configured to supply the water to the water tank; and the controller, and the controller stops the water supply of the water feed unit when the first water level detector detects the increase in the water level.

With this, compared to the fuel cell system according to Embodiment 3, it is unnecessary to supply the water to the water level detection tank. Therefore, excessive water is prevented from being supplied, and the system obtains high energy saving performance.

Further, in the fuel cell system according to Embodiment 4, when the first water level detector detects the decrease in the water level after the controller stops the water supply of the water feed unit, the controller restarts the water supply of the water feed unit.

With this, the supply of the steam to the reformer is prevented from being stopped by the lack of water in the water tank. Thus, the hydrogen generating operation can be stably performed, and therefore, the electric power generating operation of the fuel cell system can be stably performed.

Configuration of Fuel Cell System

Figure 5:
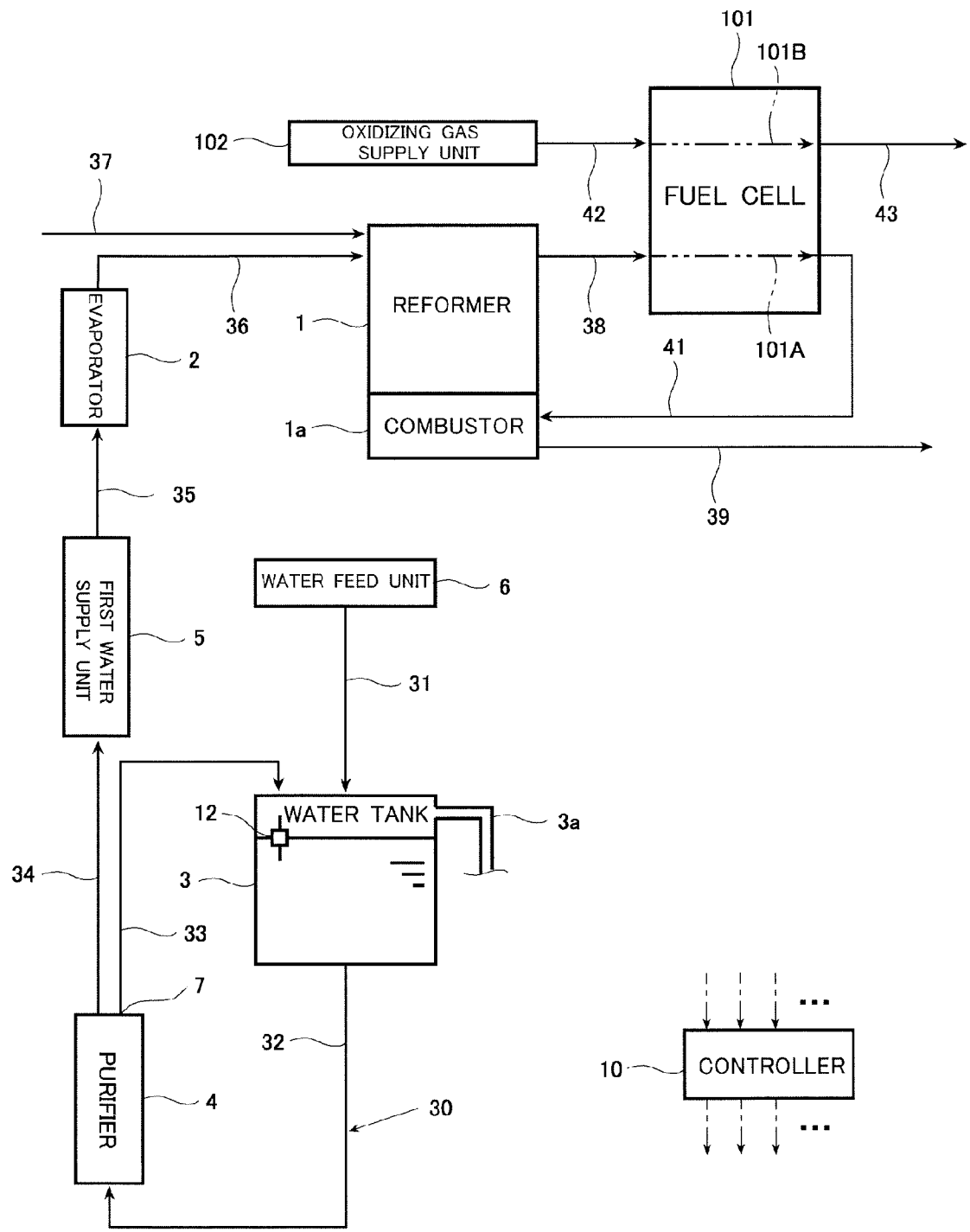
FIG. 5 is a schematic diagram showing the schematic configuration of the fuel cell system according to Embodiment 4 of the present invention.

FIG. 5 is a schematic diagram showing the schematic configuration of the fuel cell system according to Embodiment 4 of the present invention.

As shown in FIG. 5, the fuel cell system 200 according to Embodiment 4 of the present invention is the same in basic configuration as the fuel cell system 200 according to Embodiment 2 but is different from the fuel cell system 200 according to Embodiment 2 in that the first water level detector 12 is provided in the water tank 3. Specifically, the first water level detector 12 is configured to detect the water level of the water tank 3 when the purifier 4 is filled with the water.

Operations of Fuel Cell System

Next, the operations of the fuel cell system according to Embodiment 4 will be explained in reference to FIG. 5. Since the hydrogen generating operation of the reformer 1 and subsequent operations are the same as those in Embodiment 1, detailed explanations thereof are omitted.

First, as with Embodiment 1, the water feed unit 6 supplies the water through the water feed passage 31 to the water tank 3. A part of the water supplied to (stored in) the water tank 3 is supplied through the water supply passage 32 to the purifier 4. When the purifier 4 is filled with the water, the first water level detector 12 detects the water level of the water tank 3 and outputs the detection signal to the controller 10.

When the controller 10 receives the detection signal from the first water level detector 12, it determines that the purifier 4 has been filled with the water. Then, the controller 10 stops the water supply from the water feed unit 6 to the water tank 3. Next, the controller 10 supplies the combustible gas and the combustion air to the combustor 1a and causes the combustor 1a to generate the flue gas.

Next, the controller 10 activates the first water supply unit 5. By the activation of the first water supply unit 5, the water is supplied from the water tank 3 to the purifier 4. After the first water supply unit 5 is activated and when the first water level detector 12 detects that the water level of the water tank 3 is decreased by a predetermined amount, the first water level detector 12 outputs the detection signal to the controller 10.

When the controller 10 receives the detection signal from the first water level detector 12, it activates the water feed unit 6. Then, when the water is supplied to the water tank 3, and the first water level detector 12 detects that the water level of the water tank 3 is increased by, for example, a predetermined amount, the first water level detector 12 outputs the detection signal to the controller 10. As above, the controller 10 controls the operation of the water feed unit 6 in accordance with the water level of the water tank 3, the water level being detected by the first water level detector 12. Thus, the water is stably stored in the water tank 3. Therefore, the supply of the steam to the reformer 1 is prevented from being stopped by the lack of water in the water tank 3. Thus, the hydrogen generating operation can be stably performed.

Then, as described above, the water supplied to the purifier 4 is purified, and the evaporator 2 evaporates the water to generate the steam and supplies the steam to the reformer 1. In the reformer 1, the hydrogen generating operation is performed, that is, the hydrogen-containing gas is generated by the reaction between the steam and the material supplied through the material gas supply passage 37.

The fuel cell system 200 according to Embodiment 4 configured as above has the same operational advantages as the fuel cell system 200 according to Embodiment 1. In addition, in the fuel cell system 200 according to Embodiment 4, the termination of the water filling operation of the purifier 4 can be easily detected by causing the first water level detector 12 to detect the water level (full water level) of the purifier 4.

In Embodiment 4, the first valve 11 is not disposed on the degassing passage 33. However, the present embodiment is not limited to this, and the first valve 11 may be disposed as with Embodiment 3.

In this case, as with Embodiment 4, the controller 10 opens the first valve 11 when performing the water filling operation of the purifier 4 and closes the first valve 11 when performing the operation (hydrogen generating operation) of generating the hydrogen-containing gas by the reformer 1. With this, when performing the water filling operation, the same effects as Embodiment 3 are obtained, and when performing the hydrogen generating operation, the gas (mainly, air) in the water tank 3 is prevented from flowing backward through the degassing passage upstream portion 33A to the purifier 4. This reduces the possibility that the gas gets in the first water passage 34 and the first water passage 34 and the like are clogged, and this further reduces the possibility that the gas gets in the first water supply unit 5 and the amount of water supplied by the first water supply unit 5 fluctuates (so-called air entrainment).

Embodiment 5

Embodiment 5 of the present invention shows one example of a mode in which a third water passage including an open end which is open to the atmosphere is provided at a portion of the second water passage which connects the first water supply unit and the evaporator.

In the fuel cell system according to Embodiment 5, the water passage extending from the purifier to the evaporator is the second water passage, and the fuel cell system according to Embodiment 5 further includes: a third water passage configured to branch from the second water passage and including an open end which is open to the atmosphere; a first switching unit configured to connect the first water supply unit selectively to the evaporator and the open end of the third water passage; and the controller, and when the first water level detector detects that the water level of the purifier is the full water level, the controller activates the first water supply unit in a state where the first water supply unit and the open end of the third water passage are connected to each other by the first switching unit.

Here, the first switching unit may be any device as long as it can connect the first water supply unit selectively to the evaporator and the open end of the third water passage. For example, the first switching unit may be constituted by a three-way valve. As another example, two on-off valves may be respectively disposed on the second water passage and the third water passage, and the first water supply unit may be selectively connected to the evaporator and the open end of the third water passage by switching the on-off states of these two on-off valves.

Here, the phrase "a state where the first water supply unit is connected to the open end of the third water passage by the first switching unit" denotes a state where the first water supply unit communicates with the open end of the third water passage.

With this configuration, the gas (mainly, air) in the first water supply unit can be discharged to the atmosphere, and the possibility that the amount of water supplied by the first water supply unit fluctuates is reduced. In addition, the possibility that the gas gets in the second water passage from the first water supply unit and the second water passage is clogged is reduced.

Configuration of Fuel Cell System

Figure 6:
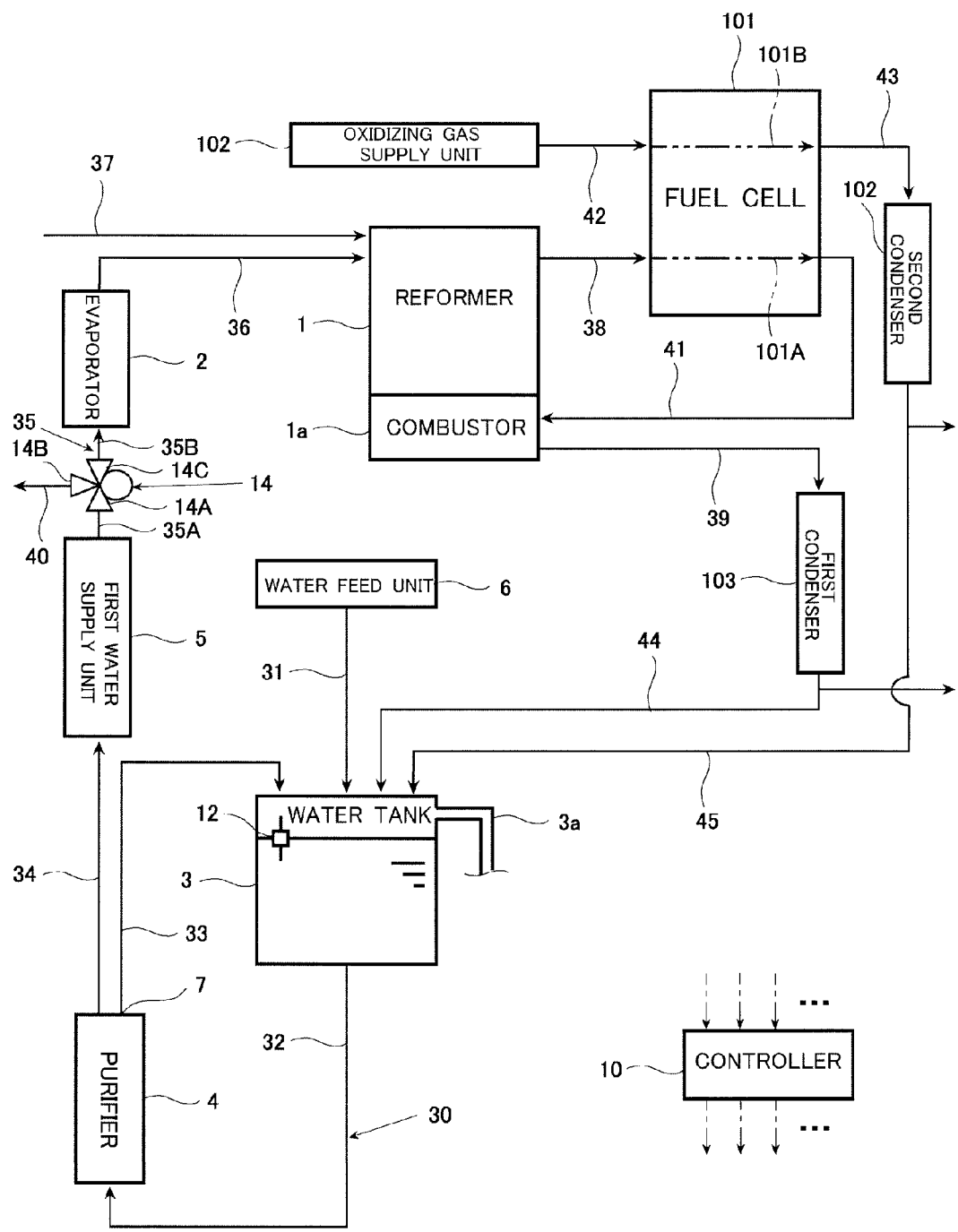
FIG. 6 is a schematic diagram showing the schematic configuration of the fuel cell system according to Embodiment 5 of the present invention.

FIG. 6 is a schematic diagram showing the schematic configuration of the fuel cell system according to Embodiment 5 of the present invention.

As shown in FIG. 6, the fuel cell system 200 according to Embodiment 5 of the present invention is the same in basic configuration as the fuel cell system 200 according to Embodiment 4 but is different from the fuel cell system 200 according to Embodiment 4 in that the fuel cell system 200 according to Embodiment 5 includes: a third water passage 40 configured to branch from the second water passage 35; and a first switching unit 14 configured to connect the first water supply unit 5 selectively to the evaporator 2 and an open end of the third water passage 40.

Specifically, the second water passage 35 includes a second water passage upstream portion 35A and a second water passage downstream portion 35B, and the first switching unit 14 constituted by a three-way valve is provided so as to connect the second water passage upstream portion 35A and the second water passage downstream portion 35B. More specifically, the second water passage upstream portion 35A connects the first water supply unit 5 and a first port 14A of the first switching unit 14, and the second water passage downstream portion 35B connects a third port 14C of the first switching unit 14 and the evaporator 2. An upstream end of the third water passage 40 is connected to a second port 14B of the first switching unit 14. A downstream end of the third water passage 40 is open to the atmosphere.

The fuel cell system 200 according to Embodiment 5 includes a first condenser 103 and a second condenser 104. The first condenser 103 is disposed on a portion of the flue gas passage 39, and the second condenser 104 is disposed on a portion of the off oxidizing gas passage 43. For example, a heat exchanger may be used as the first condenser 103, and the first condenser 103 is configured to condense the steam contained in the flue gas into the water. Similarly, for example, a heat exchanger may be used as the second condenser 104, and the second condenser 104 is configured to condense the steam contained in the off oxidizing gas into the water. With this, the flue gas generated by the combustor 1a is supplied through the flue gas passage 39 to the first condenser 103, and the water condensed by the first condenser 103 is supplied through a first condensed water passage 44 to the water tank 3. Similarly, the off oxidizing gas is supplied through the off oxidizing gas passage 43 to the second condenser 104, and the water condensed by the second condenser 104 is supplied through a second condensed water passage 45 to the water tank 3.

Operations of Fuel Cell System

Next, the operations of the fuel cell system 200 according to Embodiment 5 will be explained in reference to FIG. 6. Since the hydrogen generating operation of the reformer 1 and subsequent operations are the same as those in Embodiment 1, detailed explanations thereof are omitted.

First, as described above, the controller 10 supplies the water from the water feed unit 6 to the water tank 3. When the first water level detector 12 detects that the water level of the purifier 4 has become the full water level, the controller 10 stops the water feed unit 6.

Next, the controller 10 causes the first port 14A and second port 14B of the first switching unit 14 to communicate with each other and closes the third port 14C to realize a state where the first water supply unit 5 and the open end (downstream end) of the third water passage 40 are connected to each other. Next, the controller 10 activates the first water supply unit 5 to cause the water purified by the purifier 4 to flow through the first water passage 34, the first water supply unit 5, the second water passage upstream portion 35A, and the third water passage 40. Thus, the gas (mainly, air) in the first water passage 34, the first water supply unit 5, and the second water passage upstream portion 35A is discharged through the open end of the third water passage 40 to the atmosphere. With this, the possibility that the amount of water supplied from the first water supply unit 5 to the evaporator 2 after the water supply to the evaporator 2 is started fluctuates is reduced, and the possibility that the first water passage 34 and the second water passage 35 are clogged is reduced.

Next, after a predetermined time has elapsed, the controller 10 causes the first port 14A and third port 14C of the first switching unit 14 to communicate with each other and closes the second port 14B to supply the water to the evaporator 2. Here, the predetermined time is a time which is obtained in advance by experiments or the like and is necessary to discharge the gas in the first water passage 34, the first water supply unit 5, and the second water passage upstream portion 35A through the open end of the third water passage 40 by the water purified by the purifier 4 to a level that the first water passage 34 and the second water passage 35 are unlikely to be clogged.

Then, as described above, the water supplied to the purifier 4 is purified, and the evaporator 2 evaporates the water to generate the steam and supplies the steam to the reformer 1.

The fuel cell system 200 according to Embodiment 5 configured as above has the same operational advantages as the fuel cell system 200 according to Embodiment 4. In addition, in the fuel cell system 200 according to Embodiment 5, the possibility that the amount of water supplied from the first water supply unit 5 to the evaporator 2 after the water supply to the evaporator 2 is started fluctuates is reduced, and the possibility that the first water passage 34 and the second water passage 35 are clogged is reduced.

In Embodiment 5, the first water level detector 12 is provided at the water tank 3. However, the present embodiment is not limited to this. As with the fuel cell system 200 according to Embodiment 3, the water level detection tank 13 may be provided at a portion of the degassing passage 33, and the first water level detector 12 may be provided in the water level detection tank 13. Moreover, the first water level detector 12 may be provided in the purifier 4 or the degassing passage 33.

In Embodiment 5, the first condenser 103 and the second condenser 104 are provided. However, the present embodiment is not limited to this, and one of the first condenser 103 and the second condenser 104 may be provided.

Embodiment 6

Embodiment 6 of the present invention shows one example of a mode in which the water utilizing device is a cooling water tank configured to store cooling water for cooling the fuel cell.

In the fuel cell system according to Embodiment 6 of the present invention, the cooling water tank that is the water utilizing device includes an exhaust port which is open to the atmosphere.

With this, when performing the water filling operation of the purifier, the gas in the purifier is discharged through the cooling water tank. Therefore, the water can be smoothly supplied to the purifier.

In the fuel cell system according to Embodiment 6, the purifier is disposed on the water passage extending from the water tank to the cooling water tank such that when the water level of the water tank is the full water level, the purifier is filled with the water by the weight of the water.

In the fuel cell system according to Embodiment 6, the first water supply unit is provided upstream of the purifier, and the first water supply unit is disposed on the water passage extending from the water tank to the cooling water tank such that when the water level of the water tank is the full water level, the first water supply unit is filled with the water by the weight of the water.

Configuration of Fuel Cell System

Figure 7:
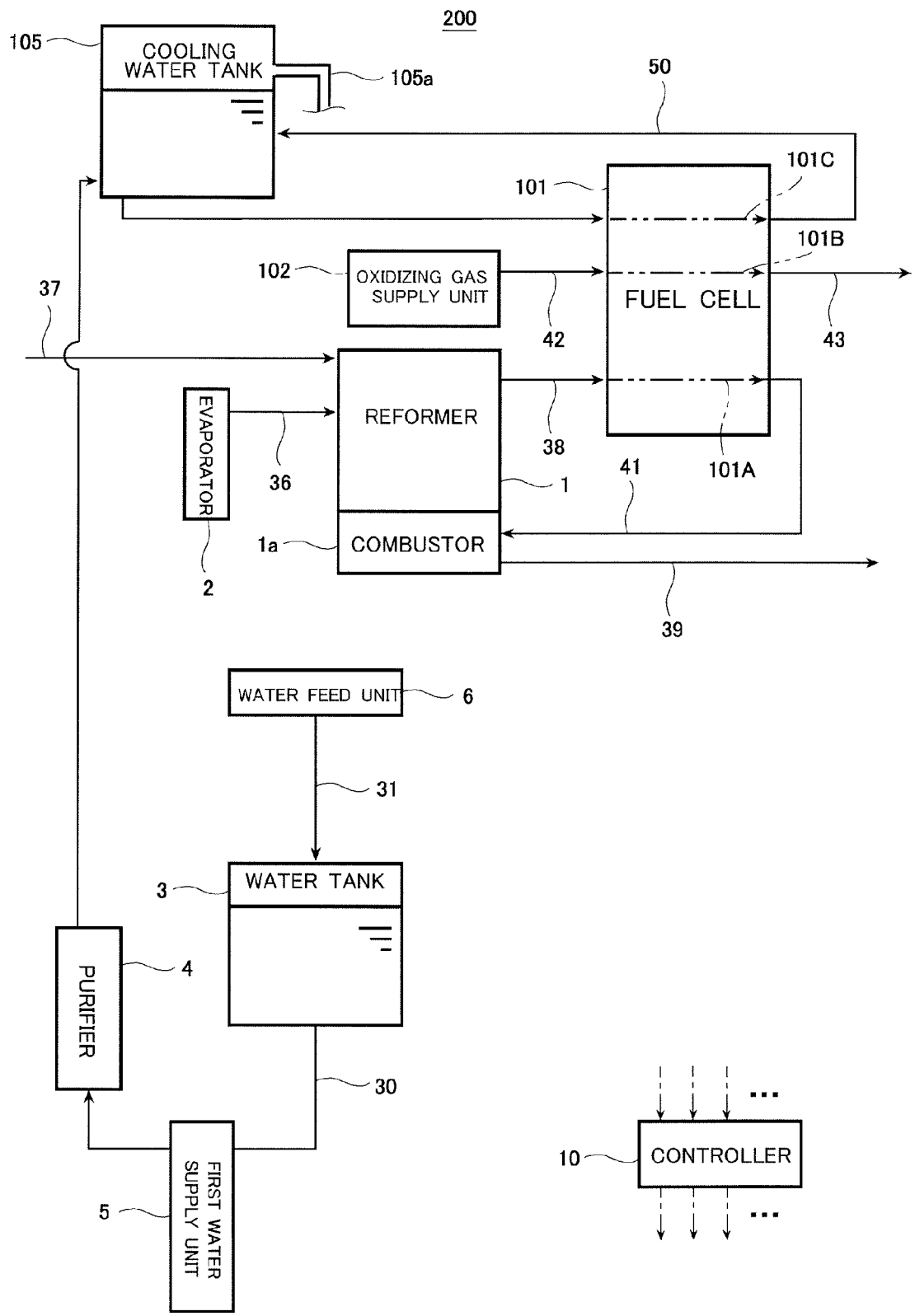
FIG. 7 is a schematic diagram showing the schematic configuration of the fuel cell system according to Embodiment 6 of the present invention.

FIG. 7 is a schematic diagram showing the schematic configuration of the fuel cell system according to Embodiment 6 of the present invention.

As shown in FIG. 7, the fuel cell system 200 according to Embodiment 6 of the present invention is the same in basic configuration as the fuel cell system 200 according to Embodiment 1 but is different from the fuel cell system 200 according to Embodiment 1 in that a cooling water tank 105 is provided as the water utilizing device. Specifically, the cooling water tank 105 is connected to the water tank 3 through a water passage 30 and is configured to store as the cooling water the water purified by the purifier 4. In Embodiment 6, the purifier 4 is provided downstream of the first water supply unit 5.

An overflow passage 105a is connected to the cooling water tank 105. A downstream end of the overflow passage 105a is open to the atmosphere. With this, when filling the purifier 4 with the water, the gas (mainly, air) in the purifier 4 is discharged through the water passage 30 and the overflow passage 105a of the cooling water tank 105 to the atmosphere. To be specific, in Embodiment 6, the cooling water tank 105 is open to the atmosphere through the overflow passage 105a.

The overflow passage 105a is one example of the exhaust port provided at the cooling water tank 105, and the present embodiment is not limited to this. For example, the exhaust port may be directly provided at the cooling water tank 105 without providing the overflow passage 105a as the exhaust port at the cooling water tank 105.

Further, the cooling water tank 105 is disposed on a cooling water passage 50 through which the cooling water flows. In the cooling water passage 50, a portion extending in the fuel cell 101 is a cooling water internal passage 101C. Here, the cooling water in the cooling water tank 105 is supplied through the cooling water passage 50 to the fuel cell 101. While the cooling water flows through the cooling water internal channel 101C, it recovers the heat generated by the fuel cell 101. Then, the cooling water is discharged from the fuel cell 101.

The supply of the water to the evaporator 2 may be performed through a branch passage provided at the water passage 30. Moreover, as described below, the cooling water may be supplied from the cooling water tank 105 to the evaporator 2.

Operations of Fuel Cell System

Next, the operations of the fuel cell system 200 according to Embodiment 6 will be explained in reference to FIG. 7. Since the hydrogen generating operation of the reformer 1 and subsequent operations are the same as those in Embodiment 1, detailed explanations thereof are omitted.

First, as with Embodiment 1, the water feed unit 6 supplies the water through the water feed passage 31 to the water tank 3. A part of the water supplied to (stored in) the water tank 3 is supplied through the water passage 30 to the purifier 4. At this time, since the purifier 4 is located lower than the water surface in the water tank 3, the water in the water tank 3 is transferred to the purifier 4 by potential head.

The first water supply unit 5 is disposed on the water passage 30 located upstream of the purifier 4 and is located lower than the water surface in the water tank 3. Therefore, the water in the water tank 3 is also transferred to the first water supply unit 5 by potential head. Then, by continuing the water supply to the water tank 3, the purifier 4 and the first water supply unit 5 can be filled with the water without activating the first water supply unit 5.

In the fuel cell system 200 according to Embodiment 6, the purifier 4 is open to the atmosphere through the overflow passage 105a of the cooling water tank 105. With this, the water supply to the purifier 4 can be performed smoothly compared to a case where the exhaust port is not provided at the cooling water tank 105. This is because if the exhaust port is not provided at the cooling water tank 105, the internal pressure of the water passage 30 increases by the water supply to the purifier 4, and the water filling operation of the purifier 4 is inhibited.

When filling the cooling water tank 105 with the water, the first water supply unit 5 is activated to supply the water in the water tank 3 through the water passage 30.

The fuel cell system 200 according to Embodiment 6 configured as above has the same operational advantages as the fuel cell system 200 according to Embodiment 1. In addition, in the fuel cell system 200 according to Embodiment 6, the power consumption of the first water supply unit 5 can be reduced compared to before, and not only the purifier 4 but also the first water supply unit 5 can be filled with the water. Further, in the fuel cell system 200 according to Embodiment 6, since the first water supply unit 5 can be filled with the water, the occurrence of air entrainment and idle operations of the first water supply unit 5 can be reduced.

The fuel cell system 200 according to Embodiment 6 is not limited to a mode in which the first water supply unit 5 is not activated at all in the water filling operation of the purifier 4. The first water supply unit 5 may be operated as long as the electric power consumed by the first water supply unit 5 when the purifier 4 and the first water supply unit 5 are filled with the water by the operation of the first water supply unit 5 is smaller than that of the conventional fuel cell system.

In Embodiment 6, the exhaust port is provided at the cooling water tank 105. However, the present embodiment is not limited to this. The exhaust port may be provided anywhere as long as it is provided at the purifier or the water passage located downstream of the purifier. Examples of the water passage located downstream of the purifier are the water passage 30, the cooling water tank 105, and the cooling water passage 50.

Therefore, for example, the exhaust port may be provided at the purifier 4 as with Embodiment 2. Moreover, the exhaust port may be provided at the water passage 30 located downstream of the purifier 4 as with Modification Example 1 of Embodiment 2.

Embodiment 7

Embodiment 7 of the present invention shows one example of a mode in which the water utilizing device is the cooling water tank, and the water is supplied from the cooling water tank to the evaporator.

In the fuel cell system according to Embodiment 7 of the present invention, the cooling water tank that is the water utilizing device, and the fuel cell system according to Embodiment 7 includes: a second water level detector configured to detect the water level of the cooling water tank; a fourth water passage configured to connect the cooling water passage and the evaporator; a second water supply unit provided at the fourth water passage; a branch passage configured to branch from the fourth water passage and including an open end which is open to the atmosphere; a second switching unit configured to connect the second water supply unit selectively to the evaporator and the branch passage; and a controller, and when the second water level detector detects that the water level of the cooling water tank is a predetermined water level, the controller activates the second water supply unit in a state where the second water supply unit and the open end of the branch passage are connected to each other by the second switching unit.

Here, the second water supply unit may be any device as long as it can adjust the flow rate of the water and supply the water to the evaporator. For example, the second water supply unit may be constituted by a flow rate control valve, a pump, or a combination of a pump and a flow rate control valve.

The second water level detector may be any device as long as it can detect the water level of the cooling water tank and output the detected water level to the controller. For example, the second water level detector may directly detect the water level of the cooling water tank or may indirectly detect the water level of the cooling water tank. For example, a float switch may be used as the second water level detector.

The second switching unit may be any device as long as it can connect the second water supply unit selectively to the evaporator and the open end of the branch passage. For example, the second switching unit may be constituted by a three-way valve. As another example, two on-off valves may be respectively disposed on the fourth water passage and the branch passage, and the second water supply unit may be selectively connected to the evaporator and the open end of the branch passage by switching the on-off states of these two on-off valves.

Further, the predetermined water level may be set arbitrarily. One example of the predetermined water level is a water level by which the amount of cooling water capable of filling the cooling water passage and the fourth water passage is secured.

With this, the gas in the second water supply unit can be discharged to the atmosphere, and the supply of the water (cooling water) to the evaporator can be performed smoothly.

The fuel cell system according to Embodiment 7 of the present invention includes a cooling water supply unit, and the controller is configured to activate the second water supply unit and the cooling water supply unit. With this, the idle operations of the second water supply unit can be reduced.

Here, the cooling water supply unit may be any device as long as it can adjust the flow rate of the cooling water and supply the cooling water to the fuel cell. For example, the cooling water supply unit may be constituted by a flow rate control valve, a pump, or a combination of a pump and a flow rate control valve.

Configuration of Fuel Cell System

Figure 8:
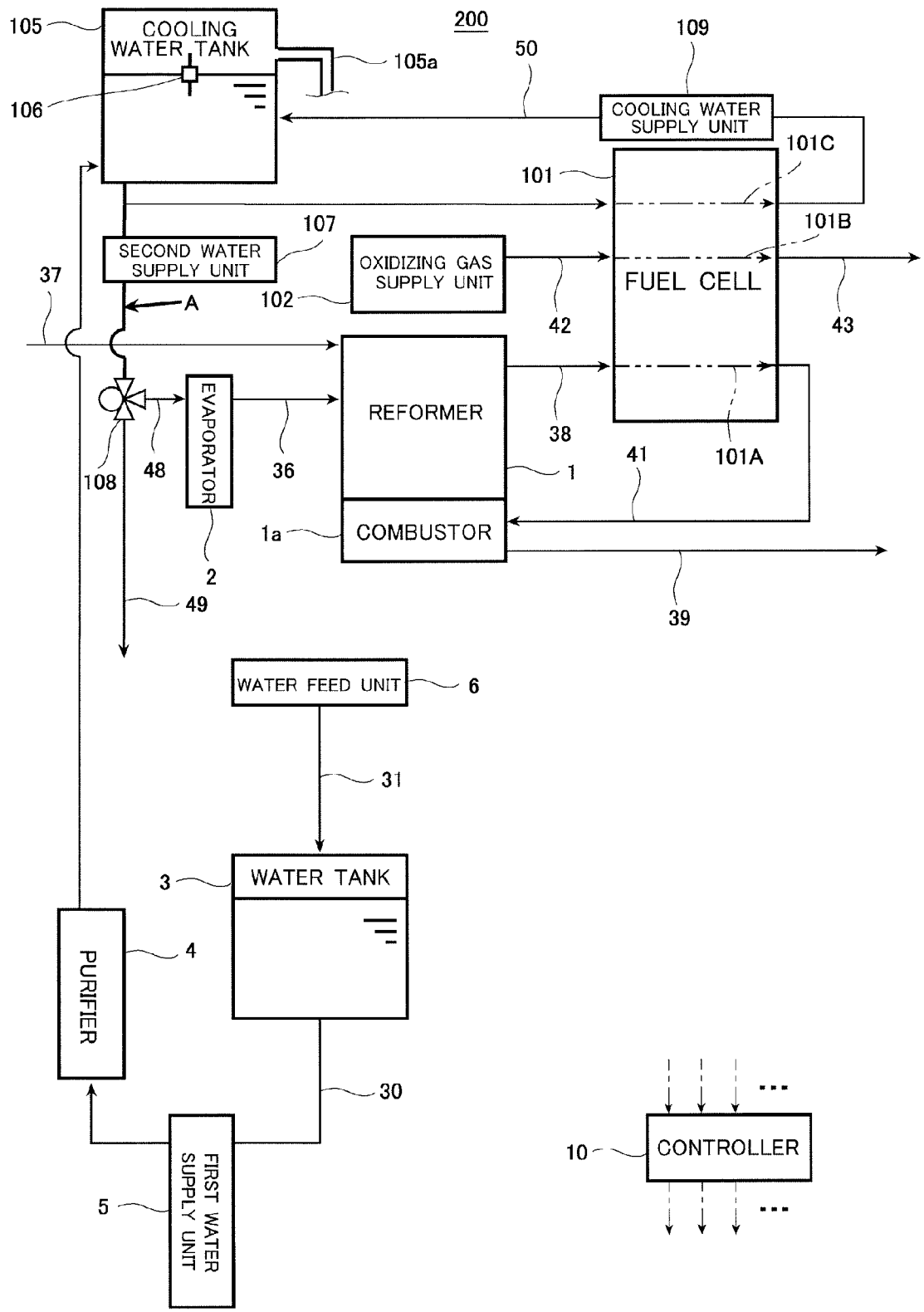
FIG. 8 is a schematic diagram showing the schematic configuration of the fuel cell system according to Embodiment 7 of the present invention.

FIG. 8 is a schematic diagram showing the schematic configuration of the fuel cell system according to Embodiment 7 of the present invention.

As shown in FIG. 8, the fuel cell system 200 according to Embodiment 7 of the present invention is the same in basic configuration as the fuel cell system 200 according to Embodiment 6 but is different from the fuel cell system 200 according to Embodiment 6 in that the fuel cell system 200 according to Embodiment 7 includes a second water level detector 106, a second water supply unit 107, a second switching unit 108, a fourth water passage 48, and a branch passage 49. Specifically, an upstream end of the fourth water passage 48 is connected to a portion of the cooling water passage 50, and a downstream end thereof is connected to the evaporator 2. The second water supply unit 107 is disposed on a portion of the fourth water passage 48.

The second water supply unit 107 may be any device as long as it is configured to supply the water in the cooling water passage 50, that is, the water in the cooling water tank 105 to the evaporator 2. For example, the second water supply unit 107 may be constituted by a pump.

The second switching unit 108 is disposed on a portion of the fourth water passage 48, the portion being located downstream of the second water supply unit 107. The branch passage 49 is connected to the second switching unit 108. With this, by the activation of the second switching unit 108, the second water supply unit 107 is selectively connected to the evaporator 2 and the open end of the branch passage 49.

The fuel cell system 200 according to Embodiment 7 includes a cooling water supply unit 109, and the cooling water supply unit 109 is disposed on the cooling water passage 50. The cooling water supply unit 109 may be any device as long as it is configured to supply the water in the cooling water tank 105 to the cooling water internal channel 101C through the cooling water passage 50. For example, a pump, the discharge rate of which is high, may be used as the cooling water supply unit 109.

Operations of Fuel Cell System

Next, the operations of the fuel cell system 200 according to Embodiment 7 will be explained in reference to FIG. 8. Since the hydrogen generating operation of the hydrogen generator 100 and subsequent operations are the same as those in Embodiment 1, detailed explanations thereof are omitted.

First, as with Embodiment 6, the controller 10 supplies the water from the water feed unit 6 to the water tank 3 and fills the first water supply unit 5 and the purifier 4 with the water. When the water level of the water tank 3 becomes a predetermined water level (for example, the full water level), the controller 10 activates the first water supply unit 5 to supply the water in the water tank 3 to the cooling water tank 105. At this time, the water flowing through the water passage 30 is purified by the purifier 4 and then supplied to the cooling water tank 105. When the water level of the water tank 3 becomes a predetermined water level, the water feed unit 6 may stop or may operate so as to maintain the predetermined water level.

Next, when the second water level detector 106 detects that the water level of the cooling water tank 105 is a predetermined water level, the controller 10 realizes a state where the second water supply unit 107 and the open end (downstream end) of the branch passage 49 are connected to each other. Next, the controller 10 activates the second water supply unit 107 to cause the water (cooling water) in the cooling water tank 105 to flow through the cooling water passage 50 to the fourth water passage 48. With this, the gas in a water passage A extending from the cooling water tank 105 to the second switching unit 108 can be discharged to the atmosphere, and the fluctuation of the flow rate of the water by the air entrainment of the second water supply unit 107 can be suppressed after the water supply to the evaporator 2 is started.

At this time, it is preferable that the controller 10 also activate the cooling water supply unit 109 to reduce the inflow of gas from the cooling water passage 50 to the fourth water passage 48 during the operation of removing the gas in the water passage A. With this, the amount of gas flowing into the fourth water passage 48 is reduced, and the idle operations of the second water supply unit 107 can be reduced.

Next, after a predetermined time has elapsed, the controller 10 activates the second switching unit 108 to connect the second water supply unit 107 and the evaporator 2 and supplies the water to the evaporator 2. Here, the predetermined time denotes a time necessary to discharge the gas in the water passage A through the branch passage 49 to the atmosphere.

Then, as described above, the evaporator 2 evaporates the supplied water to generate the steam and supplies the steam to the reformer 1.

The fuel cell system 200 according to Embodiment 7 configured as above has the same operational advantages as the fuel cell system 200 according to Embodiment 6.

In the fuel cell system 200 according to each of Embodiments 1 to 5 (including Modification Example 1 of Embodiment 2), the first water supply unit 5 is provided downstream of the purifier 4. However, the present embodiment is not limited to this, and the first water supply unit 5 may be provided upstream of the purifier 4.

In the fuel cell system 200 according to each of Embodiments 6 and 7, the first water supply unit 5 is provided upstream of the purifier 4. However, the present embodiment is not limited to this, and the first water supply unit 5 may be provided downstream of the purifier 4.

In the fuel cell system 200 according to each of Embodiments 6 and 7, the exhaust port is provided at the cooling water tank 105 as one mode in which the exhaust port is provided at any one of the purifier and the water passage located downstream of the purifier. However, the present embodiment is not limited to this, and the exhaust port may not be provided at the purifier and the water passage located downstream of the purifier.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention. In addition, various inventions can be made by suitable combinations of a plurality of components disclosed in the above embodiments.

INDUSTRIAL APPLICABILITY

According to the fuel cell system of the present invention, the purifier is provided such that when the water level of the water tank is the full water level, the purifier is filled with the water by the weight of the water. Therefore, the electric power consumed by the water supply unit when the purifier is filled with the water by the operation of the water supply unit can be made smaller than before. On this account, the fuel cell system of the present invention is useful in the field of fuel cells.

REFERENCE SIGNS LIST

1 reformer
1a combustor
2 evaporator
3 water tank
3a overflow passage
4 purifier
5 first water supply unit
6 water feed unit
7 exhaust port
10 controller
11 first valve
12 first water level detector
13 water level detection tank
14 first switching unit
14A first port
14B second port
14C third port
30 water passage
31 water feed passage
32 water supply passage
33 degassing passage
33A degassing passage upstream portion
33B degassing passage downstream portion
34 first water passage
35 second water passage
35A second water passage upstream portion
35B second water passage downstream portion
36 steam supply passage
37 material gas supply passage
38 fuel gas supply passage
39 flue gas passage
40 third water passage
41 off fuel gas passage
42 oxidizing gas supply passage
43 off oxidizing gas passage
44 first condensed water passage
45 second condensed water passage
48 fourth water passage
49 branch passage
50 cooling water passage
101 fuel cell
101A fuel gas internal channel
101B oxidizing gas internal channel
101C cooling water internal channel
102 oxidizing gas supply unit
103 first condenser
104 second condenser
105 cooling water tank
105a overflow passage
106 second water level detector
107 second water supply unit
108 second switching unit
109 cooling water supply unit
200 fuel cell system

The invention claimed is:

1. A fuel cell system comprising:
   a reformer which generates a hydrogen-containing fuel gas from a material gas and steam;
   a fuel cell which generates electric power by using the hydrogen-containing fuel gas supplied from the reformer;
   a water tank which stores water;
   a water utilizing device which utilizes the water supplied from the water tank and is mechanically, directly or indirectly connected to at least one of the reformer and the fuel cell;
   a first water supply unit disposed on a water passage extending from the water tank to the water utilizing device and which supplies the water in the water tank to the water utilizing device; and
   a purifier which is disposed on the water passage and purifies the water flowing through the water passage, wherein:
   the purifier is located lower than a full water level of the water tank, and the water in the water tank is supplied to the purifier by potential head water,
   the first water supply unit includes a pump, and
   the pump is disposed on the water passage between the purifier and the water tank.

2. The fuel cell system according to claim 1, wherein:
   the water passage extending from the purifier to the first water supply unit is a first water passage; and
   an exhaust port provided in at least one of the purifier and the first water passage, the exhaust port discharging a gas in the purifier to the atmosphere.

3. The fuel cell system according to claim 2, further comprising a degassing passage connecting the exhaust port and the water tank, wherein
   the water tank is open to the atmosphere.

4. The fuel cell system according to claim 3, wherein a first valve for opening and closing the degassing passage is disposed on the degassing passage.

5. The fuel cell system according to claim 4, further comprising a controller, wherein:
   the controller opens the first valve when performing a water filling operation of the purifier, and
   the controller closes the first valve when performing a hydrogen generating operation of the reformer.

6. The fuel cell system according to claim 1, wherein the water utilizing device is open to the atmosphere.

7. The fuel cell system according to claim 1, wherein:
   the purifier is provided downstream of the first water supply unit, and
   the first water supply unit is disposed on the water passage such that when the water level of the water tank is the full water level, the first water supply unit is filled with the water by the weight of the water.

8. The fuel cell system according to claim 1, further comprising a first water level detector which detects the water level of the purifier.

9. The fuel cell system according to claim 8, wherein the first water level detector which detects the water level of the purifier by detecting the water level of the water tank.

10. The fuel cell system according to claim 9, further comprising:
    a water feed unit which supplies the water to the water tank; and
    a controller, wherein
    when the first water level detector detects an increase in the water level, the controller stops the water supply of the water feed unit.

11. The fuel cell system according to claim 10, wherein when the first water level detector detects a decrease in the water level after the water supply of the water feed unit is stopped, the controller restarts the water supply of the water feed unit.

12. The fuel cell system according to claim 8, wherein:
    the water utilizing device is an evaporator which generates the steam; and
    the water passage extending from the purifier to the evaporator is a second water passage,
    the fuel cell system further comprising:
    a third water passage which branches from the second water passage and includes an open end which is open to the atmosphere;
    a first switching unit selectively connecting the first water supply unit to the evaporator and the open end of the third water passage; and
    a controller, wherein
    when the first water level detector detects that the water level of the purifier is the full water level, the controller activates the first water supply unit in a state where the first water supply unit and the open end of the third water passage are connected to each other by the first switching unit.

13. The fuel cell system according to claim 1, wherein:
    the water utilizing device is a cooling water tank which stores the water which is to be supplied through a cooling water passage to the fuel cell,
    the fuel cell system further comprising:
    an evaporator which generates the steam;
    a second water level detector which detects the water level of the cooling water tank;
    a fourth water passage which connects the cooling water passage and the evaporator;
    a second water supply unit disposed on the fourth water passage which supplies the water to the evaporator;
    a branch passage which branches from the fourth water passage and including an open end which is open to the atmosphere;
    a second switching unit which connects the second water supply unit selectively to the evaporator and the open end of the branch passage; and
    a controller, and
    when the second water level detector detects that the water level of the cooling water tank is a predetermined water level, the controller activates the second water supply unit in a state where the second water supply unit and the open end of the branch passage are connected to each other by the second switching unit.

14. The fuel cell system according to claim 13, further comprising a cooling water supply unit disposed on the cooling water passage which supplies the water in the cooling water tank to the fuel cell, wherein
    the controller activates the second water supply unit and the cooling water supply unit.

15. The fuel cell system according to claim 1, further comprising a water feed passage through which the water is supplied from outside the fuel cell system to the water tank.

* * * * *